(12) United States Patent
Somei et al.

(10) Patent No.: US 9,135,941 B2
(45) Date of Patent: Sep. 15, 2015

(54) DYE FOR OPTICAL INFORMATION RECORDING MEDIUM AND OPTICAL INFORMATION RECORDING MEDIUM

(75) Inventors: Hidenori Somei, Takasaki (JP); Takeo Tsuzuki, Takasaki (JP); Takuo Kodaira, Takasaki (JP); Daizo Yokoyama, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 857 days.

(21) Appl. No.: 13/139,194

(22) PCT Filed: Dec. 14, 2009

(86) PCT No.: PCT/JP2009/071083
§ 371 (c)(1),
(2), (4) Date: Jun. 10, 2011

(87) PCT Pub. No.: WO2010/073971
PCT Pub. Date: Jul. 1, 2010

(65) Prior Publication Data
US 2011/0244164 A1 Oct. 6, 2011

(30) Foreign Application Priority Data
Dec. 22, 2008 (JP) .................................. 2008-325506

(51) Int. Cl.
*G11B 7/24* (2013.01)
*G11B 7/2492* (2013.01)
(Continued)

(52) U.S. Cl.
CPC ............ *G11B 7/2492* (2013.01); *C09B 29/004* (2013.01); *C09B 29/3678* (2013.01);
(Continued)

(58) Field of Classification Search
CPC ................. G11B 7/2467; G11B 2007/24606; G11B 2007/24905
USPC ............................ 428/64.4, 64.8; 430/270.16
See application file for complete search history.

(56) References Cited

U.S. PATENT DOCUMENTS 7,778,145 B2    8/2010    Horie et al.
8,075,976 B2 *    12/2011    Miyazawa et al. ........... 428/64.8
(Continued)

FOREIGN PATENT DOCUMENTS

CN           1839434 A     9/2006
CN        101238182 A     8/2008
(Continued)

OTHER PUBLICATIONS

The Chinese Search Report issued by the State Intellectual Property Office of China, mailed Apr. 8, 2013 for Chinese counterpart application No. 200980152053.2.
(Continued)

*Primary Examiner* — Gerard Higgins
(74) *Attorney, Agent, or Firm* — Law Office of Katsuhiro Arai (57) ABSTRACT

Provided is an optical information recording medium employing an In-Groove recording system, and having a preferable recording characteristic with a high modulation degree and low jitter characteristics. The medium is comprised of a circular-disk shaped substrate 2 having a through hole at a center portion thereof and a helical guide groove 3 on one surface thereof; a reflective layer 4 formed on the guide groove 3 of the substrate 2; a recording layer 5 formed on the reflective layer 4 and composed of an organic material including a dye; a protection layer 6 provided on the recording layer 5; and a light-transmissive layer 7 formed on the protection layer 6. The recording layer 5 includes an organic dye which is an azo metal complex compound having a structure represented by (Chemical formula 1) and a functional group represented by (Chemical formula 2).

5 Claims, 4 Drawing Sheets (51) Int. Cl.
   *C09B 29/036* (2006.01)
   *C09B 29/36* (2006.01)
   *C09B 45/18* (2006.01)
   *C09B 45/20* (2006.01)
   *C09B 45/22* (2006.01)
   *G11B 7/2467* (2013.01)
   *G11B 7/246* (2013.01)
   *G11B 7/249* (2013.01)

(52) U.S. Cl.
   CPC .......... *C09B45/18* (2013.01); *C09B 45/20* (2013.01); *C09B 45/22* (2013.01); *G11B 7/2467* (2013.01); *G11B 2007/24606* (2013.01); *G11B 2007/24905* (2013.01)

(56) References Cited

U.S. PATENT DOCUMENTS

| | | |
|---|---|---|
| 2006/0204706 A1 | 9/2006 | Horie et al. |
| 2009/0263611 A1 | 10/2009 | Miyazawa et al. |
| 2010/0173114 A1 | 7/2010 | Kurose et al. |
| 2011/0311752 A1 | 12/2011 | Miyazawa et al. |

FOREIGN PATENT DOCUMENTS

| | | |
|---|---|---|
| EP | 1903561 A1 | 3/2008 |
| JP | 2007-045147 A | 2/2007 |
| JP | 2007196661 A | 8/2007 |
| WO | 2006/009107 A | 1/2006 |
| WO | WO 2007007748 A1 * | 1/2007 |
| WO | 2007074861 A1 | 7/2007 |

OTHER PUBLICATIONS

The Extended European Search Report issued by the European Patent Office, mailed Mar. 28, 2012, for European counterpart Application No. 09834772.7.

* cited by examiner

|  | Dye | λmax (nm) | OD | Recording power (mW) | Modulation degree (%) | DC jitter (%) |
|---|---|---|---|---|---|---|
| Example 1 | Chemical Formula 3 | 383 | 0.24 | 5.3 | 48 | 7.5 |
| Example 2 | Chemical Formula 4 | 374 | 0.28 | 5.6 | 49 | 7.4 |
| Example 3 | Chemical Formula 5 | 386 | 0.29 | 5.6 | 49 | 7.4 |
| Example 4 | Chemical Formula 6 | 377 | 0.28 | 5.3 | 48 | 7.5 |
| Example 5 | Chemical Formula 7 | 383 | 0.25 | 5.5 | 49 | 7.4 |
| Example 6 | Chemical Formula 8 | 384 | 0.24 | 5.5 | 40 | 8.0 |
| Example 7 | Chemical Formula 9 | 387 | 0.26 | 5.6 | 51 | 7.7 |
| Example 8 | Chemical Formula 10 | 386 | 0.30 | 5.8 | 44 | 7.9 |
| Example 9 | Chemical Formula 11 | 381 | 0.28 | 5.4 | 45 | 7.6 |
| Example 10 | Chemical Formula 12 | 377 | 0.29 | 5.7 | 41 | 7.5 |
| Example 11 | Chemical Formula 13 | 379 | 0.33 | 5.7 | 40 | 8.1 |
| Example 12 | Chemical Formula 14 | 388 | 0.35 | 5.9 | 42 | 8.2 |
| Example 13 | Chemical Formula 15 | 379 | 0.28 | 5.6 | 46 | 7.8 |
| Comparative Example 1 | Chemical Formula 16 | 428 | 0.20 | 5.4 | 31 | 10.2 |
| Comparative Example 2 | Chemical Formula 17 | 337 | 0.34 | 7.4 | 38 | 14.5 |

DYE FOR OPTICAL INFORMATION RECORDING MEDIUM AND OPTICAL INFORMATION RECORDING MEDIUM

This application is the U.S. National Phase under 35 U.S.C. §371 of International Application PCT/JP2009/071083, filed Dec. 14, 2009, which claims priority to Japanese Patent Application No. 2008-325506, filed Dec. 22, 2008. The International Application was published under PCT Article 21(2) in a language other than English.

TECHNICAL FIELD

The present invention relates to an optical information recording medium and an organic dye used for optical information recording medium, and more specifically to a dye for optical information recording medium ideal for recordable Blu-ray Discs (BD-Rs) that adopt In-Groove recording, as well as an optical information recording medium using the same.

BACKGROUND ART

Optical discs and other optical information recording media are becoming increasingly popular as media for recording information. These optical information recording media include recordable CDs (CD-Rs), which are each a light-transmissive resin substrate of 1.2 mm in thickness and 120 mm or 80 mm in diameter on which a reflective layer and recording layer are formed sequentially. In recent years, however, there is a demand for higher information recording density. To meet this demand, methods that use a shorter laser wavelength and object lens having a larger NA (numerical aperture) have been researched and new optical information recording media such as recordable DVDs (DVD±Rs) have been developed. These DVD±Rs adopt a structure where two light-transmissive resin substrates of 0.6 mm in thickness each are attached to each other, with a reflective layer and recording layer sandwiched in between, to increase the tolerance for the disc's tilt to support shorter wavelengths and larger NAs.

In recent years, however, there is a demand for even higher information recording density to record high-definition image data. To meet this demand, optical information recording media that use laser beams of even shorter wavelengths to record and play back information have been proposed. Examples of these optical information recording media include recordable HD_DVDs (HD_DVD-Rs) having a recording capacity of 15 GB per side, and recordable Blu-ray Discs (BD-Rs) having a recording capacity of 25 GB per side.

HD_DVD-Rs adopt a structure where a recording layer and reflective layer are formed sequentially on a resin substrate of 0.6 mm in thickness having a guide groove (pre-groove) formed on one side, after which a protection layer is formed thereon to protect the reflective layer, and then a dummy substrate of 0.6 mm in thickness is attached thereon. This structure itself is the same as that of DVD±Rs. BD-Rs, on the other hand, are structured in such a way that a reflective layer and recording layer are formed sequentially on a resin substrate of 1.1 mm in thickness having a guide groove formed on one side, after which a protection layer constituted by a light-transmissive inorganic material is provided thereon to protect the recording layer, and then a cover layer of 0.1 mm in thickness constituted by a light-transmissive resin is provided thereon, with the resulting layered structure formed to a diameter and thickness equivalent to CD-Rs and DVD±Rs. Recording layers of these optical recording media are constituted by organic materials containing azo dye, cyanine dye or other organic dye or inorganic materials such as Si, Cu, Sb, Te and Ge, and record or play back data by means of a laser beam of 405 nm in wavelength.

If an organic dye is to be used for the recording layer, a dye that provides good recording characteristics under a laser beam of 405 nm in wavelength is selected. Examples of such dye ideal for optical information recording medium include those disclosed in Japanese Patent Laid-open Nos. 2007-45147 and 2007-196661.

BACKGROUND ART LITERATURES

Patent Literature 1 Japanese Patent Laid-open No. 2007-45147

Patent Literature 2 Japanese Patent Laid-open No. 2007-196661

SUMMARY OF THE INVENTION

Problems to be Solved by the Invention

Dyes disclosed in the aforementioned known literatures are basically usable for both HD_DVD-Rs and BD-Rs. After an earnest study by the inventors, however, it was found that, in reality, optimal dye characteristics vary depending on the recording method, or specifically between On-Groove recording and In-Groove recording.

On HD_DVD-Rs, a guide groove is projecting from the laser beam irradiation side. Accordingly, the recording method of HD_DVD-Rs is On-Groove recording. Under On-Groove recording, light is focused onto an area smaller than a laser beam spot. For this reason, the pits formed by irradiating the recording laser beam are subject to relatively less shape disturbance and offer relatively good recording characteristics such as jitter characteristics.

On the other hand, BD-Rs have their guide groove concaved toward the laser beam irradiation side. Accordingly, the recording method of BD-Rs is In-Groove recording. Under In-Groove recording, light is not focused unlike under On-Groove recording. Also, BD-Rs are characterized by a track pitch, or interval of guide grooves, of 0.32 μm, and since this is smaller than the laser beam wavelength of 405 nm, less light from the laser beam enters the guide groove. This results in the problems of pit shape disturbance and difficulty achieving good recording.

To achieve good recording under In-Groove recording, a dye is needed that can provide a recording layer offering high recording sensitivity, or permitting recording at relatively low laser output, while also demonstrating relatively high modulation degree and relatively low jitter characteristics. The present invention proposes an organic dye that can achieve good recording characteristics for BD-Rs adopting In-Groove recording, and it also proposes an optical information recording medium using such dye.

Means for Solving the Problems

The present invention proposes a dye for optical information recording medium, which is a dye used for optical information recording medium and contains an organic dye expressed by the chemical formula below:

(Chemical Formula 1)

A is selected from (a1) to (a8) under (Chemical Formula 2). M is selected from Ni, Co and Cu.

(Chemical Formula 2)

(a1)

(a2)

(a3)

(a4)

(a5)

(a6)

-continued (a7)

(a8)

The present invention also proposes an optical information recording medium, comprising: a substrate having a spiral guide groove on one side; a reflective layer formed on the one side of the substrate; a recording layer formed on the reflective layer; a protection layer formed on the recording layer; and a light-transmissive layer formed on the protection layer; wherein the recording layer contains an organic dye and an organic dye expressed by the aforementioned chemical formula is used as the aforementioned organic dye.

Effects of the Invention

According to the present invention, good recording characteristics such as high modulation degree and low jitter characteristics can be achieved by an optical information recording medium based on the In-Groove recording method. Having good recording sensitivity, such medium can support high recording speeds of at least double speed.

DESCRIPTION OF THE SYMBOLS

1 Optical information recording medium
2 Substrate
3 Guide groove
4 Reflective layer
5 Recording layer
6 Protection layer
7 Light-transmissive layer
TP Track pitch

MODE FOR CARRYING OUT THE INVENTION

An embodiment pertaining to the optical information recording medium proposed by the present invention is explained below. An optical information recording medium 1 shown in FIG. 1 has: a circular-disk shaped substrate 2 having a through hole (not illustrated) at the center and a helical guide groove 3 on one side; a reflective layer 4 formed on the guide groove 3 of the substrate 2; a recording layer 5 formed on the reflective layer 4 and constituted by an organic material containing a dye; a protection layer 6 provided on the recording layer 5; and a light-transmissive layer 7 formed on the protection layer 6.

Figure 1:
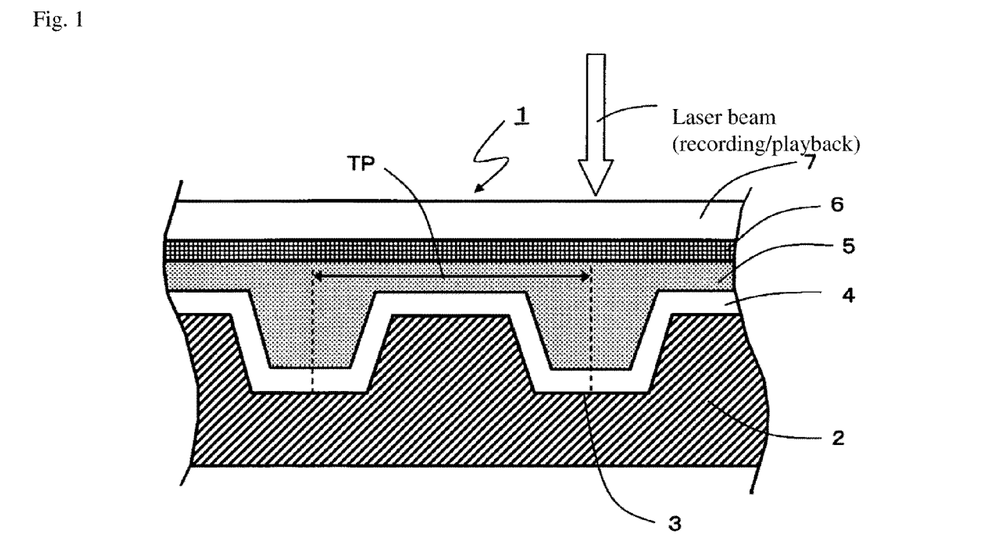
FIG. 1 is a schematic drawing showing an enlarged view of the cross-section of an embodiment of an optical information recording medium hereunder.

The substrate 2 is a resin substrate of 1.1 mm in thickness t and 120 mm in diameter. For this substrate 2, any of various materials used as substrate materials for conventional optical information recording media can be selected and used. Specific examples include polycarbonate, polymethyl methacrylate or other acrylic resin, polyvinyl chloride, vinyl chloride copolymer or other vinyl chloride resin, epoxy resin, amorphous polyolefin, polyester resin, aluminum or other metal, or glass, which can be combined or mixed or otherwise used together if necessary. Among the aforementioned materials, thermoplastic resins are preferable as they offer good formability, moisture resistance, dimensional stability and low price, etc., and polycarbonate is especially preferable. This substrate 2 is formed by injection molding. A stamper is set in the dies to form a spiral guide groove 3 on the substrate 2. This guide groove 3 is formed with a track pitch TP of 0.32 μm and pits are formed in this guide groove 3.

The reflective layer 4 is constituted by a thin metal film of high reflectivity, such as Ag alloy or Al alloy, and formed by means of sputtering, etc. A favorable thickness of the reflective layer 4 is between 55 nm and 65 nm.

The recording layer 5 contains a dye proposed by the present invention. Specific examples of this organic dye proposed by the present invention include those expressed by the chemical formulas illustrated under (Chemical Formula 3) to (Chemical Formula 15) below. It should be noted that any dye, not expressed by any of the following chemical formulas, can be used as long as it is within the scope of the present invention.

(Chemical Formula 3)

(Chemical Formula 4)

(Chemical Formula 5)

(Chemical Formula 6)

(Chemical Formula 7)

(Chemical Formula 8)

(Chemical Formula 9)

(Chemical Formula 10)

(Chemical Formula 11)

-continued

(Chemical Formula 12)

(Chemical Formula 13)

(Chemical Formula 14)

(Chemical Formula 15)

Figure 2:
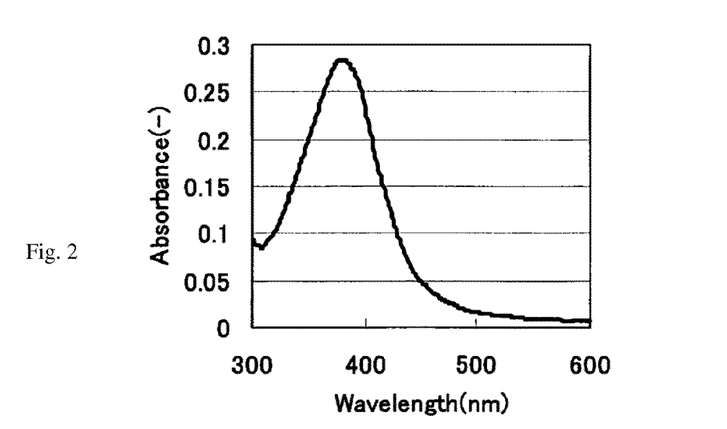
FIG. 2 is an absorption spectrum of a dye expressed by (Chemical Formula 3).

Any of these dyes can be dissolved in a TFP (tetrafluoropropanol) solution, for example, and the obtained dye solution can be applied by the spin coat method in such a way as to achieve the optical density (hereinafter abbreviated as "OD") corresponding to the minimum DC jitter. Here, OD indicates the absorbance of the dye at the maximum optical absorption wavelength. The OD of each dye is measured by applying the recording layer 5 directly on the substrate 2 shown in FIG. 1 and measuring the absorbance using a beam having the maximum absorption wavelength of the applicable dye. For example, a dye expressed by (Chemical Formula 3) has the absorption spectrum shown in FIG. 2. Since its maximum absorption wavelength ($\lambda$max) is 383 nm, the absorbance is measured with a beam of 383 nm in wavelength to derive the OD. The OD is adjusted according to the film forming conditions (rotational speed, time, etc.). The OD corresponding to the minimum DC jitter is determined by preparing multiple sample discs produced by different film forming conditions of the recording layer 5 constituting the optical information recording medium 1 to vary the OD, recording data on these sample discs with varying ODs using a commercially available recording/playback apparatus (such as ODU-1000 by Pulstec), and then obtaining DC jitters and analyzing the obtained results. For example, the measured OD of a dye expressed by (Chemical Formula 3) was 0.24. Spin coat is performed under the film forming conditions corresponding to the OD determined above, to form the recording layer 5.

The protection layer 6 is used to prevent mixing phenomena, such as diffusion of the dye contained in the recording layer 5 to the light-transmissive layer 7, or permeation into the recording layer 5 of the solvent for curable resin used in the formation of the light-transmissive layer 7, when the light-transmissive layer 7 is formed. Materials that can be used to constitute this protection layer 6 include: oxides such as silicon oxides, especially silicon dioxide, zinc oxide, cerium oxide and yttrium oxide; sulfides such as zinc sulfides and yttrium sulfides; nitrides such as silicon nitrides; silicon carbides; and mixtures of oxide and sulfur compound. This protection layer 6 is formed by means of sputtering, etc. A favorable thickness of the protection layer 6 is approx. 20 nm.

The light-transmissive layer 7 is constituted by a light-transmissive resin and formed by using the spin coat method, etc., to adjust to a thickness of 0.1 mm a UV or radiation-curable resin, or by attaching a transparent resin of 0.1 mm in thickness. The light-transmissive of this light-transmissive layer 7 should be 70% or above, or preferably 80% or above, when measured by a spectrophotometer using a beam of 405 nm in wavelength at a layer thickness of 0.1 mm. Note that a hard coat layer (not illustrated) constituted by an acrylic resin, etc., can be provided on the surface of the side from which the beam enters, because the light-transmissive layer 7 is relatively soft and scratches easily.

Now, the effects of the present invention are explained using examples.

Example 1

A circular-disk shaped polycarbonate substrate of 120 mm in outer diameter and 1.1 mm in thickness, having a through hole at the center as well as a guide groove of 0.32 μm in track pitch, 180 nm in groove width and 32 nm in groove depth, was created by injection molding. The side of this substrate on which the guide groove is formed was sputtered with Ag alloy to form a reflective layer of 60 nm in thickness. Thereafter, a dye solution constituted by a TFP (tetrafluoropropanol) solvent in which an organic dye expressed by the chemical formula under (Chemical Formula 3) was dissolved was applied by the spin coat method under film forming conditions achieving an OD of 0.24, after which the surface was allowed to dry for 30 minutes at 80° C. to form a recording layer.

Next, a transparent protection layer constituted by ZnS—$SiO_2$ was formed by sputtering to a thickness of 20 nm. After that, a UV-curable resin whose modulus of elasticity in cured state at 25° C. becomes 1700 MPa was applied by the spin coat method and then cured, to form a light-transmissive layer of 0.1 mm in thickness.

Pits were recorded in the guide groove of the obtained optical information recording medium using a recording/playback apparatus (ODU-1000 by Pulstec) at a wavelength of 405 nm, NA of 0.85 and recording speed of 9.89 m/sec (double speed), and playback characteristics were evaluated. The evaluation items included the power of recording laser beam (recording power), modulation degree and DC jitter. The recording sensitivity was considered good when the recording power at the minimum DC jitter was 6.0 mW or less. The passing condition for modulation degree was set to 40% or more. The passing condition for DC jitter was set to a minimum value of 10% or less.

Figure 3:
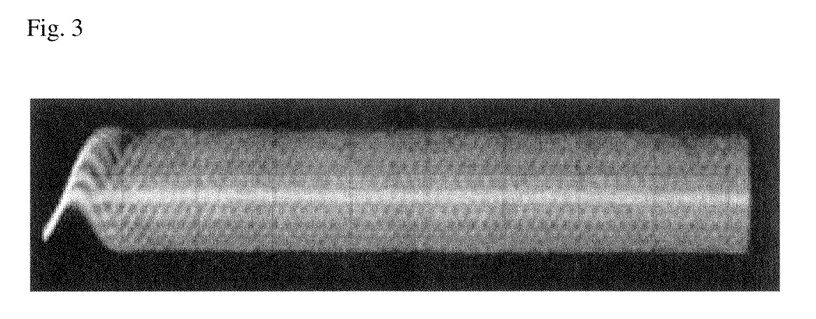
FIG. 3 is an eye pattern of an optical information recording medium using a dye expressed by (Chemical Formula 3).

The optical information recording medium in Example 1 had a recording power of 5.3 mW, modulation degree of 48% and DC jitter of 7.5%. When the medium was played back by adjusting the laser power to 0.35 mW, the clear eye pattern shown in FIG. 3 was observed.

Example 2

Figure 4:
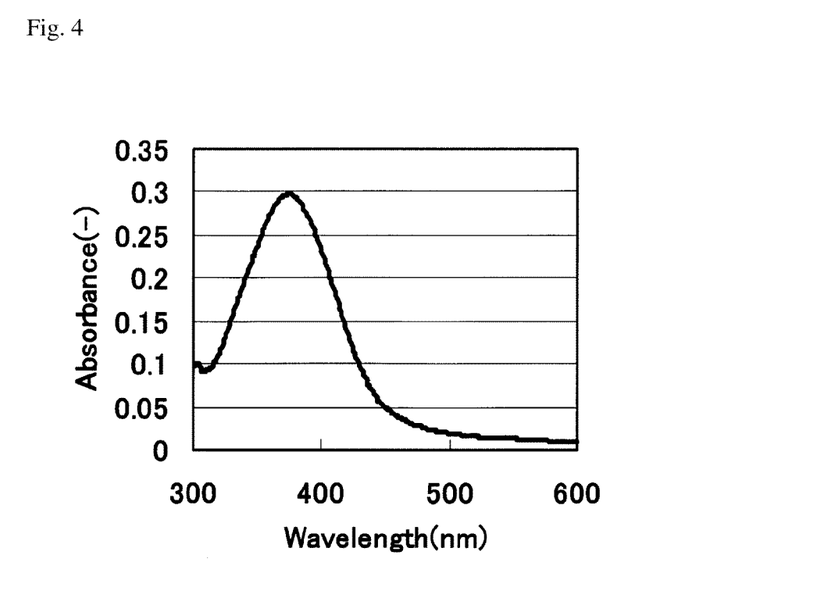
FIG. 4 is an absorption spectrum of a dye expressed by (Chemical Formula 4).

An optical information recording medium was obtained in the same manner as in Example 1, except that an organic dye expressed by the chemical formula under (Chemical Formula 4) was used for the recording layer. The dye expressed by (Chemical Formula 4) had the absorption spectrum shown in FIG. 4. Since its maximum absorption wavelength ($\lambda$max) was 374 nm, the absorbance was measured with a beam of 374 nm in wavelength to derive the OD. Also, the OD corresponding to the minimum DC jitter was 0.28, so the recording layer was formed under film forming conditions achieving an OD of 0.28.

Figure 5:
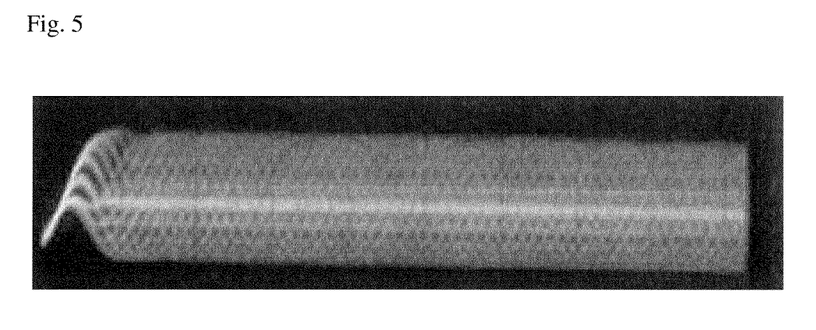
FIG. 5 is an eye pattern of an optical information recording medium using a dye expressed by (Chemical Formula 4).

Recording was performed on the obtained sample optical information recording medium using a recording/playback apparatus (ODU-1000 by Pulstec) in the same manner as in Example 1, and playback characteristics were evaluated. The eye pattern at a laser power of 0.35 mW was also observed. The optical information recording medium in Example 2 had a recording power of 5.6 mW, modulation degree of 49% and DC jitter of 7.4%. The clear eye pattern shown in FIG. 5 was also observed.

Example 3

Figure 6:
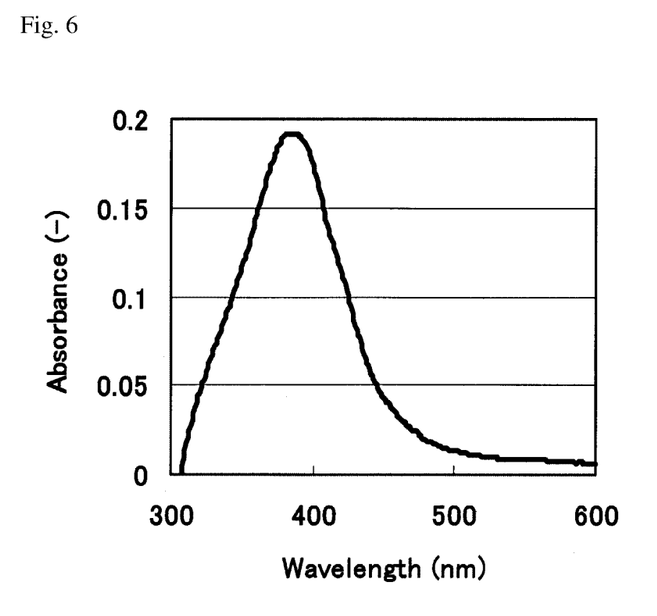
FIG. 6 is an absorption spectrum of a dye expressed by (Chemical Formula 5).

An optical information recording medium was obtained in the same manner as in Example 1, except that an organic dye expressed by the chemical formula under (Chemical Formula 5) was used for the recording layer. The dye expressed by (Chemical Formula 5) had the absorption spectrum shown in FIG. 6. Since its maximum absorption wavelength ($\lambda$max) was 386 nm, the absorbance was measured with a beam of 386 nm in wavelength to derive the OD. Also, the OD corresponding to the minimum DC jitter was 0.28, so the recording layer was formed under film forming conditions achieving an OD of 0.28.

Figure 7:
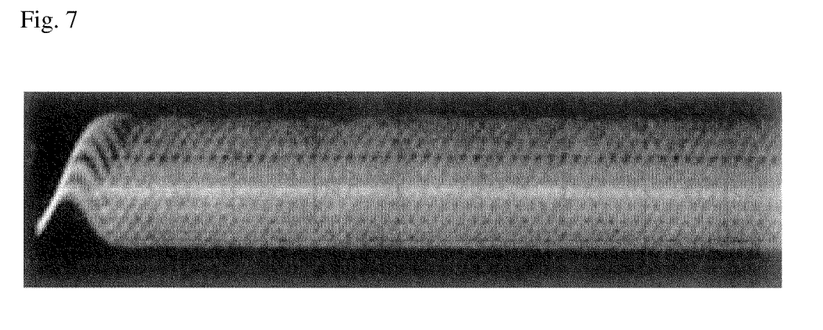
FIG. 7 is an eye pattern of an optical information recording medium using a dye expressed by (Chemical Formula 5).

Recording was performed on the obtained sample optical information recording medium using a recording/playback apparatus (ODU-1000 by Pulstec) in the same manner as in Example 1, and playback characteristics were evaluated. The eye pattern at a laser power of 0.35 mW was also observed. The optical information recording medium in Example 3 had a recording power of 5.6 mW, modulation degree of 49% and DC jitter of 7.4%. The clear eye pattern shown in FIG. 7 was also observed.

Example 4

An optical information recording medium was obtained in the same manner as in Example 1, except that an organic dye expressed by the chemical formula under (Chemical Formula 6) was used for the recording layer. Since the dye expressed by (Chemical Formula 6) had a maximum optical absorption wavelength ($\lambda$max) of 377 nm, the absorbance was measured with a beam of 377 nm in wavelength to derive the OD. Also, the OD corresponding to the minimum DC jitter was 0.28, so the recording layer was formed under film forming conditions achieving an OD of 0.28.

Recording was performed on the obtained sample optical information recording medium using a recording/playback apparatus (ODU-1000 by Pulstec) in the same manner as in Example 1, and playback characteristics were evaluated. The optical information recording medium in Example 4 had a recording power of 5.3 mW, modulation degree of 48% and DC jitter of 7.5%.

Example 5

An optical information recording medium was obtained in the same manner as in Example 1, except that an organic dye expressed by the chemical formula under (Chemical Formula 7) was used for the recording layer. Since the dye expressed by (Chemical Formula 7) had a maximum optical absorption wavelength ($\lambda$max) of 383 nm, the absorbance was measured with a beam of 383 nm in wavelength to derive the OD. Also, the OD corresponding to the minimum DC jitter was 0.25, so the recording layer was formed under film forming conditions achieving an OD of 0.25.

Recording was performed on the obtained sample optical information recording medium using a recording/playback apparatus (ODU-1000 by Pulstec) in the same manner as in Example 1, and playback characteristics were evaluated. The optical information recording medium in Example 5 had a recording power of 5.5 mW, modulation degree of 49% and DC jitter of 7.4%.

Example 6

An optical information recording medium was obtained in the same manner as in Example 1, except that an organic dye expressed by the chemical formula under (Chemical Formula 8) was used for the recording layer. Since the dye expressed by (Chemical Formula 8) had a maximum optical absorption wavelength ($\lambda$max) of 384 nm, the absorbance was measured with a beam of 384 nm in wavelength to derive the OD. Also, the OD corresponding to the minimum DC jitter was 0.24, so the recording layer was formed under film forming conditions achieving an OD of 0.24.

Recording was performed on the obtained sample optical information recording medium using a recording/playback apparatus (ODU-1000 by Pulstec) in the same manner as in Example 1, and playback characteristics were evaluated. The optical information recording medium in Example 6 had a recording power of 5.5 mW, modulation degree of 40% and DC jitter of 8.0%.

Example 7

An optical information recording medium was obtained in the same manner as in Example 1, except that an organic dye expressed by the chemical formula under (Chemical Formula 9) was used for the recording layer. Since the dye expressed by (Chemical Formula 9) had a maximum optical absorption wavelength ($\lambda$max) of 387 nm, the absorbance was measured with a beam of 387 nm in wavelength to derive the OD. Also, the OD corresponding to the minimum DC jitter was 0.26, so the recording layer was formed under film forming conditions achieving an OD of 0.26.

Recording was performed on the obtained sample optical information recording medium using a recording/playback apparatus (ODU-1000 by Pulstec) in the same manner as in Example 1, and playback characteristics were evaluated. The optical information recording medium in Example 7 had a recording power of 5.6 mW, modulation degree of 51% and DC jitter of 7.7%.

Example 8

An optical information recording medium was obtained in the same manner as in Example 1, except that an organic dye expressed by the chemical formula under (Chemical Formula 10) was used for the recording layer. Since the dye expressed by (Chemical Formula 10) had a maximum optical absorption wavelength ($\lambda$max) of 386 nm, the absorbance was measured with a beam of 386 nm in wavelength to derive the OD. Also, the OD corresponding to the minimum DC jitter was 0.30, so the recording layer was formed under film forming conditions achieving an OD of 0.30.

Recording was performed on the obtained sample optical information recording medium using a recording/playback apparatus (ODU-1000 by Pulstec) in the same manner as in Example 1, and playback characteristics were evaluated. The optical information recording medium in Example 8 had a recording power of 5.8 mW, modulation degree of 44% and DC jitter of 7.9%.

Example 9

An optical information recording medium was obtained in the same manner as in Example 1, except that an organic dye expressed by the chemical formula under (Chemical Formula 11) was used for the recording layer. Since the dye expressed by (Chemical Formula 11) had a maximum optical absorption wavelength (λmax) of 381 nm, the absorbance was measured with a beam of 381 nm in wavelength to derive the OD. Also, the OD corresponding to the minimum DC jitter was 0.28, so the recording layer was formed under film forming conditions achieving an OD of 0.28.

Recording was performed on the obtained sample optical information recording medium using a recording/playback apparatus (ODU-1000 by Pulstec) in the same manner as in Example 1, and playback characteristics were evaluated. The optical information recording medium in Example 9 had a recording power of 5.4 mW, modulation degree of 45% and DC jitter of 7.6%.

Example 10

An optical information recording medium was obtained in the same manner as in Example 1, except that an organic dye expressed by the chemical formula under (Chemical Formula 12) was used for the recording layer. Since the dye expressed by (Chemical Formula 12) had a maximum optical absorption wavelength (λmax) of 377 nm, the absorbance was measured with a beam of 377 nm in wavelength to derive the OD. Also, the OD corresponding to the minimum DC jitter was 0.29, so the recording layer was formed under film forming conditions achieving an OD of 0.29.

Recording was performed on the obtained sample optical information recording medium using a recording/playback apparatus (ODU-1000 by Pulstec) in the same manner as in Example 1, and playback characteristics were evaluated. The optical information recording medium in Example 10 had a recording power of 5.7 mW, modulation degree of 41% and DC jitter of 7.5%.

Example 11

An optical information recording medium was obtained in the same manner as in Example 1, except that an organic dye expressed by the chemical formula under (Chemical Formula 13) was used for the recording layer. Since the dye expressed by (Chemical Formula 13) had a maximum optical absorption wavelength (λmax) of 379 nm, the absorbance was measured with a beam of 379 nm in wavelength to derive the OD. Also, the OD corresponding to the minimum DC jitter was 0.33, so the recording layer was formed under film forming conditions achieving an OD of 0.33.

Recording was performed on the obtained sample optical information recording medium using a recording/playback apparatus (ODU-1000 by Pulstec) in the same manner as in Example 1, and playback characteristics were evaluated. The optical information recording medium in Example 11 had a recording power of 5.7 mW, modulation degree of 40% and DC jitter of 8.1%.

Example 12

An optical information recording medium was obtained in the same manner as in Example 1, except that an organic dye expressed by the chemical formula under (Chemical Formula 14) was used for the recording layer. Since the dye expressed by (Chemical Formula 14) had a maximum optical absorption wavelength (λmax) of 388 nm, the absorbance was measured with a beam of 388 nm in wavelength to derive the OD. Also, the OD corresponding to the minimum DC jitter was 0.35, so the recording layer was formed under film forming conditions achieving an OD of 0.35.

Recording was performed on the obtained sample optical information recording medium using a recording/playback apparatus (ODU-1000 by Pulstec) in the same manner as in Example 1, and playback characteristics were evaluated. The optical information recording medium in Example 12 had a recording power of 5.9 mW, modulation degree of 42% and DC jitter of 8.2%.

Example 13

An optical information recording medium was obtained in the same manner as in Example 1, except that an organic dye expressed by the chemical formula under (Chemical Formula 15) was used for the recording layer. Since the dye expressed by (Chemical Formula 15) had a maximum optical absorption wavelength (λmax) of 379 nm, the absorbance was measured with a beam of 379 nm in wavelength to derive the OD. Also, the OD corresponding to the minimum DC jitter was 0.28, so the recording layer was formed under film forming conditions achieving an OD of 0.28.

Recording was performed on the obtained sample optical information recording medium using a recording/playback apparatus (ODU-1000 by Pulstec) in the same manner as in Example 1, and playback characteristics were evaluated. The optical information recording medium in Example 13 had a recording power of 5.6 mW, modulation degree of 46% and DC jitter of 7.8%.

Comparative Example 1

An optical information recording medium was obtained in the same manner as in Example 1, except that an organic dye expressed by the chemical formula under (Chemical Formula 16) was used for the recording layer. Since the dye expressed by (Chemical Formula 16) had a maximum optical absorption wavelength (λmax) of 428 nm, the absorbance was measured with a beam of 428 nm in wavelength to derive the OD. Also, the OD corresponding to the minimum DC jitter was 0.20, so the recording layer was formed under film forming conditions achieving an OD of 0.20.

(Chemical Formula 16)

Recording was performed on the obtained sample optical information recording medium using a recording/playback apparatus (ODU-1000 by Pulstec) in the same manner as in Example 1, and playback characteristics were evaluated. The optical information recording medium in Comparative Example 1 had a recording power of 5.4 mW, modulation degree of 31% and DC jitter of 10.2%.

Comparative Example 2

An optical information recording medium was obtained in the same manner as in Example 1, except that an organic dye expressed by the chemical formula under (Chemical Formula 17) was used for the recording layer. Since the dye expressed by (Chemical Formula 17) had a maximum optical absorption wavelength (λmax) of 337 nm, the absorbance was measured with a beam of 337 nm in wavelength to derive the OD. Also, the OD corresponding to the minimum DC jitter was 0.34, so the recording layer was formed under film forming conditions achieving an OD of 0.34.

(Chemical Formula 17)

Recording was performed on the obtained sample optical information recording medium using a recording/playback apparatus (ODU-1000 by Pulstec) in the same manner as in Example 1, and playback characteristics were evaluated. The optical information recording medium in Comparative Example 2 had a recording power of 7.4 mW, modulation degree of 38% and DC jitter of 14.5%.

Figure 8:
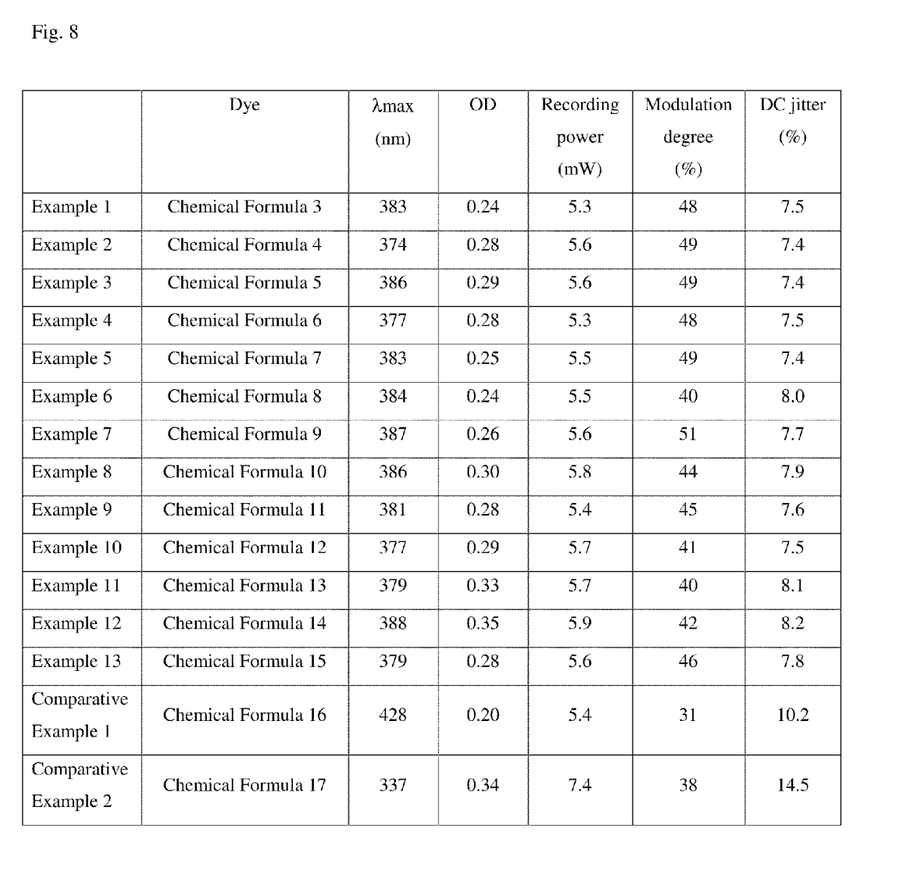
FIG. 8 is a table summarizing the results of Examples 1 to 13 and Comparative Examples 1 and 2.

The above results are summarized in the table shown in FIG. 8. These results reveal that an optical information recording medium offering good recording characteristics can be obtained using a dye conforming to the present invention. It is also clear that, because the samples used in the above Examples have a structure similar to BD-Rs, a dye conforming to the present invention is suitable for optical information recording media based on the In-Groove recording method.

The invention claimed is:

1. An optical information recording medium, comprising: a substrate having a spiral guide groove on one side; a reflective layer formed on the one side of the substrate; a recording layer formed on the reflective layer; a protection layer formed on the recording layer; and a light-transmissive layer formed on the protection layer;
   wherein the recording layer contains an organic dye and an organic dye expressed by the following chemical formula is used as the organic dye:

(Chemical Formula 1)

wherein A is selected from (a3), (a5), (a6), and (a8) under (Chemical Formula 2), while M is selected from Ni, Co and Cu:

(Chemical Formula 2)

(a3)

(a5)

(a6)

(a8)

2. The optical information recording medium according to claim 1, which is an In-Groove recording medium.

3. The optical information recording medium according to claim 1, wherein the organic dye is the only dye used in the recording layer.

4. The optical information recording medium according to claim 2, wherein the recording layer has an optical density (OD) of 0.24 to 0.33.

5. An optical information recording medium, comprising: a substrate having a spiral guide groove on one side; a reflective layer formed on the one side of the substrate; a recording layer formed on the reflective layer; a protection layer formed on the recording layer; and a light-transmissive layer formed on the protection layer,
   wherein the recording layer contains an organic dye selected from the group consisting of:

(Chemical Formula 3)

(Chemical Formula 4)

(Chemical Formula 5)

(Chemical Formula 6)

(Chemical Formula 7)

(Chemical Formula 9)

(Chemical Formula 10)

(Chemical Formula 11)

(Chemical Formula 12)

(Chemical Formula 13)

(Chemical Formula 14)

(Chemical Formula 15)

* * * * *